(12) United States Patent
Cuffaro et al.

(10) Patent No.: US 7,949,342 B2
(45) Date of Patent: May 24, 2011

(54) RADIO RESOURCE MANAGEMENT IN WIRELESS LOCAL AREA NETWORKS

(75) Inventors: Angelo Cuffaro, Laval (CA); Paul Marinier, Brossard (CA); Christopher Cave, Candiac (CA); Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/951,124

(22) Filed: Sep. 27, 2004

(65) Prior Publication Data

US 2005/0153702 A1 Jul. 14, 2005

Related U.S. Application Data

(60) Provisional application No. 60/534,853, filed on Jan. 8, 2004.

(51) Int. Cl.
*H04W 72/00* (2009.01)
*H04B 15/00* (2006.01)

(52) U.S. Cl. ............... 455/452.2; 455/452.1; 455/63.1; 455/453

(58) Field of Classification Search .......... 455/418, 455/453, 63.1, 422.1, 452.2
See application file for complete search history.

(56) References Cited

U.S. PATENT DOCUMENTS

| | | | | |
|---|---|---|---|---|
| 5,060,292 A | * | 10/1991 | Ayukawa et al. | 455/505 |
| 5,794,157 A | * | 8/1998 | Haartsen | 455/522 |
| 5,946,346 A | * | 8/1999 | Ahmed et al. | 375/219 |
| 6,097,956 A | * | 8/2000 | Veeravalli et al. | 455/446 |
| 6,157,616 A | | 12/2000 | Whitehead | |
| 6,215,982 B1 | * | 4/2001 | Trompower | 455/63.3 |
| 6,757,522 B1 | * | 6/2004 | Naegeli et al. | 455/67.11 |
| 7,450,522 B2 | * | 11/2008 | Feder et al. | 370/252 |
| 2002/0004407 A1 | * | 1/2002 | Simonsson | 455/522 |
| 2002/0060995 A1 | | 5/2002 | Cervello et al. | |
| 2002/0068534 A1 | | 6/2002 | Ue et al. | |
| 2002/0105925 A1 | * | 8/2002 | Shoemake | 370/330 |
| 2003/0040319 A1 | * | 2/2003 | Hansen et al. | 455/452 |
| 2004/0037247 A1 | * | 2/2004 | Ngo | 370/332 |
| 2004/0063434 A1 | * | 4/2004 | Hamalainen et al. | 455/450 |
| 2004/0127157 A1 | * | 7/2004 | Chu et al. | 455/9 |
| 2004/0203688 A1 | * | 10/2004 | Backes et al. | 455/422.1 |
| 2004/0229621 A1 | * | 11/2004 | Misra | 455/445 |
| 2005/0048963 A1 | * | 3/2005 | Kubler et al. | 455/423 |
| 2005/0073989 A1 | * | 4/2005 | Wang et al. | 370/349 |
| 2005/0153660 A1 | * | 7/2005 | Braun et al. | 455/67.13 |

FOREIGN PATENT DOCUMENTS

| | | |
|---|---|---|
| JP | 06-069860 | 3/1994 |
| JP | 07-212833 | 8/1995 |

(Continued)

*Primary Examiner* — Marivelisse Santiago-Cordero
*Assistant Examiner* — Marisol Figueroa
(74) *Attorney, Agent, or Firm* — Volpe and Koenig, P.C.

(57) ABSTRACT

A method for radio resource management (RRM) in a wireless local area network (WLAN) having an access point and a station begins by obtaining a first group of parameters from a current traffic channel. Measurements from all available channels are taken for a second group of parameters. The radio resources of the WLAN are autonomously managed by selectively invoking at least one RRM algorithm that uses at least one parameter. A RRM algorithm may be invoked based upon results produced by a previously executed RRM algorithm, whereby RRM algorithms may be continuously invoked such that the radio resources are autonomously managed.

3 Claims, 5 Drawing Sheets

| | FOREIGN PATENT DOCUMENTS | |
|---|---|---|
| JP | 07-245784 | 9/1995 |
| JP | 2001/237856 | 8/2001 |
| KR | 2001/19462 | 3/2001 |
| KR | 2003/11914 | 2/2003 |
| WO | 01/37446 | 5/2001 |
| WO | 02/093839 | 11/2002 |

* cited by examiner

RADIO RESOURCE MANAGEMENT IN WIRELESS LOCAL AREA NETWORKS

CROSS REFERENCE TO RELATED APPLICATION

This application claims the benefit of U.S. Provisional Application No. 60/534,853, filed Jan. 8, 2004, which is incorporated by reference as if fully set forth herein.

FIELD OF INVENTION

The present application relates generally to methods and systems for radio resource management (RRM) in wireless local area networks, and more particularly to RRM procedures to self-configure a network.

BACKGROUND OF THE INVENTION

Wireless communication systems are well known in the art. Generally, such systems comprise communication stations that transmit and receive wireless communication signals between each other. Depending upon the type of system, communication stations typically are one of two types: base stations or wireless transmit/receive units (WTRUs), which include mobile units.

The term base station as used herein includes, but is not limited to, a base station, a Node B, a site controller, an access point, or other interfacing device in a wireless environment that provides WTRUs with wireless access to a network with which the base station is associated.

The term WTRU as used herein includes, but is not limited to, a user equipment, a mobile station, a fixed or mobile subscriber unit, a pager, or any other type of device capable of operating in a wireless environment. WTRUs include personal communication devices, such as phones, video phones, and Internet ready phones with network connections. In addition, WTRUs also include portable personal computing devices, such as PDAs and notebook computers with wireless modems that have similar network capabilities. WTRUs that are portable or can otherwise change location are referred to as mobile units.

Typically, a network of base stations is provided where each base station is capable of conducting concurrent wireless communications with appropriately configured WTRUs. Some WTRUs are configured to conduct wireless communications directly between each other, i.e., without being relayed through a network via a base station. This is commonly called peer to peer wireless communications. WTRUs can be configured for use in multiple networks with both network and peer to peer communications capabilities.

One type of wireless system, called a wireless local area network (WLAN), can be configured to conduct wireless communications with WTRUs equipped with WLAN modems that are also able to conduct peer to peer communications with similarly equipped WTRUs. In a WLAN, a WTRU is referred to as a station and a base station is referred to as an access point.

There are two prevalent ways to implement wireless communications in WLANs and other networks: an infrastructure mode and an ad hoc mode. In the infrastructure mode, WTRUs conduct wireless communications via a base station that serves as an access point to the network infrastructure. The communications are coordinated and synchronized through the base station. Such a configuration is also called a basic service set (BSS) within WLAN contexts. In contrast to the infrastructure mode, the ad hoc mode does not use the network infrastructure. The ad hoc mode operates with peer to peer communications and is called an "independent BSS".

A popular wireless local area network environment with one or more WLAN access points, i.e., base stations, is built according to the IEEE 802.11 family of standards. Typical applications for this type of system include hot spots (e.g., airports), home use, and office use. As more and more of these systems are becoming prevalent, there is a need to simplify the operation and maintenance of the systems. Many current systems require significant expertise and understanding from the user. In an office environment, a radio cell planner is required to plan the deployment of the system to avoid interference and capacity issues. In a home system, a user must be knowledgeable enough to avoid interference from other home devices such as Bluetooth devices, microwave ovens, cordless phones, and other neighboring WLAN systems. The nature of interference is time-varying and implies that the sophisticated user or radio cell planner would be required to adapt the system periodically to combat the changing interference. This, of course, is highly unrealistic and therefore there is a need to automatically manage the WLAN system based on the changing environment. The present invention fulfills two main requirements: (1) self-configuration and ease of deployment and (2) increased capacity and contiguous coverage.

To facilitate self-configuration and ease of deployment, it is desirable to provide an access point (AP) which, when powered up, automatically selects the optimum operational parameters, such as transmission power, frequency, energy detect threshold, etc., where minimal or no configuration data is required from the installer. In addition, it would be desirable for the AP to periodically monitor its environment and adjust the various parameters to optimize aggregate throughput and to provide contiguous and predictable coverage.

SUMMARY

A method for radio resource management (RRM) in a wireless local area network (WLAN) having an access point and a station begins by obtaining a first group of parameters from a current traffic channel. Measurements from all available channels are taken for a second group of parameters. The radio resources of the WLAN are autonomously managed by selectively invoking at least one RRM algorithm that uses at least one parameter. A RRM algorithm may be invoked based upon results produced by a previously executed RRM algorithm, whereby RRM algorithms may be continuously invoked such that the radio resources are autonomously managed.

A self-configuring access point (AP) includes a measuring device, an automatic power and channel selection device, a load balancing device, an interference management device, and a link controller. The measuring device measures a group of parameters of an environment of the AP. The automatic power and channel selection device determines transmission power levels and selects channels based on the parameters. The load balancing device balances the load between APs based on the group of parameters and does not use inter-AP communication. The interference management device is used to compensate for external and internal interference based on the group of parameters. The link controller monitors downlink quality and adjusts scheduling and data rate.

An integrated circuit for radio resource management (RRM) in a wireless local area network (WLAN) having an access point (AP) and a station includes obtaining means for obtaining a first group of parameters from a current traffic channel; measurement means taking measurements from all available channels for a second group of parameters; and managing means for managing the radio resources of the WLAN autonomously by selectively invoking at least one RRM algorithm that uses at least one parameter.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENTS

Figure 1:
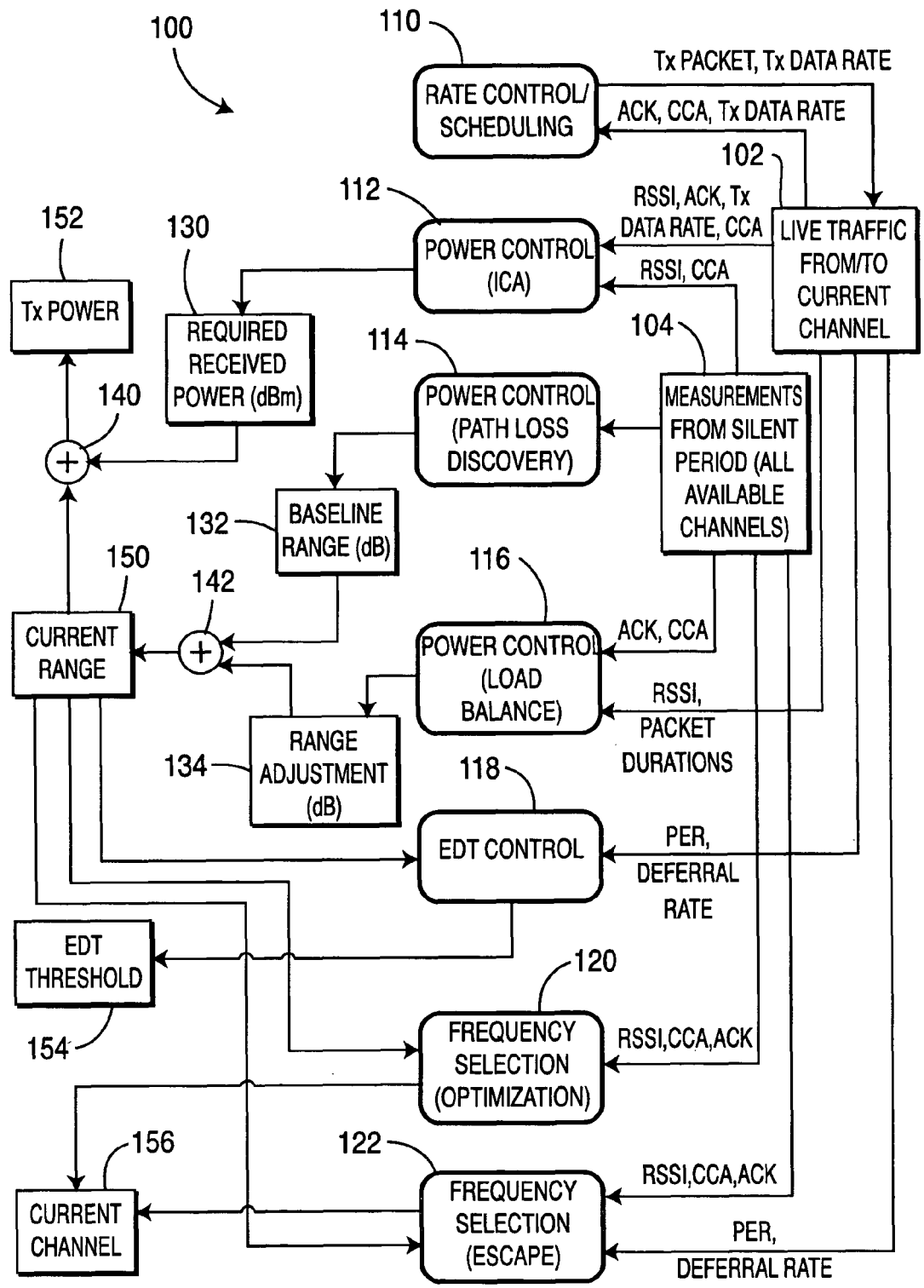
FIG. 1 is an overview diagram of a RRM algorithm architecture in accordance with the present invention.

The present invention is a distributed radio resource management (RRM) system that collectively enables optimum performance of a WLAN system. The present invention is able to operate within the following constraints: full compliance with 802.11a/b/e/g, no inter-AP communication, co-existence with typical APs, no special requirements on the stations (i.e., no special measurement information from the stations), and no centralized controller. However, the invention is not restricted to these constraints and can be applied if one or more of these constraints are removed.

The present invention's decisions are based on what the AP receives and monitors. Each action taken by the individual APs do not coalesce to form a chaotic and unstable system. The system is designed such that each AP works in unison with the other APs, even when inter-AP communication is not used. The present invention is comprised of four main features: Automatic Power and Channel Selection, Load Balancing, Interference Management, and Link Control. Together, these four features work in unison to form a highly efficient and robust RRM system.

I. Automatic Power and Channel Selection

Automatic power and channel selection (APCS) is used both when the AP is powered up and during steady state operation. This feature automatically determines the baseline coverage area and the frequency channel at initial setup. Thereafter, it periodically monitors the surrounding environment in order to adjust these parameters as needed (such as when there are physical changes to the environment, installation or de-installation of a new AP, etc.). The baseline coverage area corresponds to the area within which acceptable coverage is to be provided to stations, and is defined in terms of the path loss at its edge, called the baseline range. This internal parameter is determined through a path loss discovery process, which estimates the path loss from this AP to neighboring APs by monitoring the available channels. The baseline range is used as one of the three inputs in setting the current transmission power of the AP. The other two inputs are determined by the load balancing feature and the interference compensation and avoidance feature. These inputs address adjustments in coverage area and required received power, respectively. The baseline range is also used as one of several inputs in setting the energy detect (ED) threshold used in the clear channel assessment (CCA) procedure, which is used by the AP to determine when to attempt transmission and reception of packets.

II. Load Balancing

Load balancing is used to balance the load across APs and frequency channels. It is comprised of two complementary mechanisms, AP load balancing and channel load balancing. AP load balancing adjusts the coverage area of the AP. A range adjustment is applied in setting the current transmission power in order to correct for severe imbalances between the load of the selected AP and the load in neighboring APs, regardless of the frequency channels these APs use.

The main use case for this feature is a meeting room scenario, where a large group of people meets in a conference room for a short period of time. This feature helps manage the increased load of the AP serving the conference room area by temporarily increasing the coverage area of the neighboring APs and decreasing the serving AP's coverage area. This feature provides benefits in two ways: stations currently served by the heavily loaded AP may be better served by one of the neighboring APs, and current stations in the heavily loaded AP will benefit with better access to the medium due to the offloading of one or more stations to the neighboring APs. This scenario will be discussed in greater detail below.

Channel load balancing is used to equalize the load among different frequency channels. This is performed by periodically assessing the load in APs using different channels. A decision to use a frequency channel used by lightly loaded neighboring APs may be taken and the change of channel is performed when there is no activity in the BSS served by the AP. Both load balancing mechanisms are independent and provide constructive improvement in scenarios where the load is not balanced across channels and/or APs.

III. Interference Compensation and Avoidance

Interference compensation and avoidance (ICA) is used to compensate for external and internal interference. The ICA feature is comprised of three processes: slow interference estimation, fast interference estimation, and frequency selection escape.

In general, the goal of slow interference estimation is to slowly and continuously estimate the required received power for acceptable quality. The required received power is used as one of three inputs in setting the current transmission power of the AP. This is performed through monitoring of successful and failed transmissions in order to determine the received power at the stations to achieve an acceptable data rate.

The goal of the fast interference estimation process is to quickly adjust the required received power to account for sudden and large changes in external interference due to microwave ovens, elevators, etc. The interference is determined through monitoring of the received signal strength indicator (RSSI) when no packet has been detected.

In cases where the BSS is experiencing excessively high congestion situations or when interference is intolerable, an attempt is made to select another frequency channel. The frequency channel escape process monitors the deferral rate, packet error rate (PER), and interference. Since a service interruption is required to change the frequency channel, the channel is only changed if the current loading and/or interference are unsupportable.

IV. Link Control

Link control is used to monitor the downlink quality perceived by the channel, and to adjust both the scheduling and the data rate. Link control is composed of two processes: rate control and scheduler. Rate control adjusts the data rate based on the perceived quality at the station. Missed acknowledgements will decrease the instantaneous rate. A rate recovery process also exists to recover the rate on positive acknowledgements. In addition, the current load of the medium will influence the speed of rate reduction and recovery.

The scheduler attempts to maximize the use of the medium by prioritizing higher data rate transmissions over lower data rate transmissions. Lower data rate transmissions use more of the medium than higher data rate transmissions for the same amount of data. Therefore, in terms of maximizing throughput, it is beneficial to prioritize the high data rate transmissions. However, this scheme may induce unacceptable delay for the lower data rate stations. To minimize the delay, the current delay of the lower data rate users is considered along with the priority in choosing the next packet to send.

The 802.11e standard enables prioritization of delay sensitive services over others such as voice and video streaming. Admission control and 802.11e-based scheduling allows the AP to prioritize and manage station requests for use of the medium. These functions proactively help the AP understand the maximum supportable load. In 802.11e, the station requests access to the medium by providing information such as average data rate required. This helps the AP estimate the current and future loads on the medium, enabling accurate admission control decisions.

V. Algorithm Architecture Overview, Interactions, and Timing

FIG. 1 is a diagram showing an overview of a RRM system 100 constructed in accordance with the present invention. The inputs to the system 100 are derived from live traffic on the current channel 102 and measurements taken during a silent period 104. The measurements 104 are taken when the AP is not transmitting and are taken across all available channels. The inputs 102, 104 are supplied to the various algorithms 110-122 that make up the overall RRM system 100. In FIG. 1, the rectangles represent inputs and outputs to/from the algorithms or processes and the rounded rectangles represent algorithms and/or processes.

Processes that require relatively quick reaction times, such as rate control/scheduling, power control (fast interference estimation), EDT control, and frequency selection escape monitor the traffic from the current channel. The remaining processes such as power control (path loss discovery), power control (load balance), and frequency selection optimization, which have relatively slow reaction times, rely on measurements taken during the silent period. The inputs and outputs are well coordinated among the various algorithms and processes. For example, the current range determined by the path loss discovery and load balance processes are used by EDT control and frequency selection.

A rate control/scheduling algorithm 110 receives acknowledgements (ACKs), CCA thresholds, and the transmission data rate from the current channel 102. The rate control/scheduling algorithm 110 attempts to set the transmission data rate given the current operating conditions. It reacts almost instantaneously (generally under one second) to packet error rates (i.e., one or two missing ACKs) and channel utilization, and thus its actions are nearly independent of the other processes. Its operating environment is influenced by the other processes, which attempt to improve the transmission rate, such that on average the transmission rate is high. For example, the power control (ICA) algorithm 112 attempts to adjust the power based on various factors including average data rate.

A power control (ICA) algorithm 112 receives RSSI values, ACKs, the transmission data rate, and CCA thresholds from the current channel 102, and receives RSSI measurements and CCA thresholds from the silent period measurements 104. The power control (ICA) algorithm 112 estimates and adjusts for perceived interference at the stations and produces a required received power value 130, which is passed to a first adder 140. The power control (ICA) algorithm 112 includes two parts: fast power control and slow power control. The fast power control algorithm reacts in response to large and sudden interference. It collects measurements on the current channel 102 and operates periodically (approximately every second) or as needed to adjust the required received power value 130. The slow power control algorithm reacts based upon the perceived quality at the station. It collects measurements on the current channel 102 and operates periodically (approximately every minute) or as needed to adjust the required received power value 130.

A power control (path loss discovery) algorithm 114 receives RSSI silent period measurements 104. The power control (path loss discovery) algorithm 114 attempts to determine the optimal coverage area of the cell by monitoring the neighboring AP transmissions on all channels. The range of the cell is independent of the frequency channel used and only depends on the pathloss to the neighboring APs. The power control (path loss discovery) algorithm 114 produces a baseline range value 132 and passes this value to a second adder 142. When the system is in a stable state, the algorithm 114 periodically collects the silent period measurements 104 and updates the baseline range value 132. During new AP discovery, the algorithm 114 collects measurements from the new AP during the silent period and updates the baseline range value 132. The new AP transmits loud packets more often, which decreases the required collection time to approximately one minute.

A power control (load balance) algorithm 116 receives RSSI values and packet durations from the current channel 102, and receives ACKs and CCA thresholds from the silent period measurements 104. The power control (load balance) algorithm 116 is used adjust the coverage area in order to correct for severe imbalances between the load of this AP and the load in neighboring APs. Load balancing is performed across APs and is independent of the frequency channel. The power control (load balance) algorithm 116 produces a range adjustment value 134, which is passed to the second adder 142.

An energy detect threshold (EDT) control algorithm 118 receives packet error rate (PER) and deferral rate information from the current channel 102. The EDT control algorithm 118 attempts to determine an EDT threshold value 154 such that both transmission and reception of packets is optimized. This is mainly based on PER and deferral rate. The EDT threshold value 154 is bound by the current range of the cell and the receiver sensitivity. This algorithm executes relatively quickly, making it independent of the actions taken by other processes. A frequency channel change causes EDT to reset the EDT threshold to the minimum value (receiver sensitivity). Any change in the current range value 150 by the power control algorithms 114, 116 which affects the current setting of the EDT threshold value 154 will be adjusted within approximately one second.

A frequency selection (optimization) algorithm 120 receives RSSI measurements, CCA thresholds, and ACKs from the silent period measurements 104. The frequency selection (optimization) algorithm 120 is used to optimize the use of the available channels amongst the APs. It performs a kind of load balancing across channels rather than across APs. This ensures that the actions taken by the power control (load balance) algorithm 116 and frequency selection (optimization) algorithm 120 are independent and non-conflicting. For example, an action taken by the power control algorithms to increase or decrease the coverage area of an AP is based on measurements across all channels, and therefore is valid for any available channel for this AP. The frequency selection (optimization) algorithm 120 changes to a new current channel 156 when there is no activity on the channel.

A frequency selection (escape) algorithm 122 receives PER and deferral rate information from the current channel 102, and receives RSSI values, CCAs, and ACKs from the silent period measurements 104. The frequency selection (escape) algorithm 122 reacts to intolerable levels of interference and congestion in situations where increasing the AP power (fast and slow interference estimation), increasing/decreasing the ED threshold (EDT control), or reducing transmission data rate (rate control/scheduling) will not help. The frequency selection (escape) algorithm 122 reacts in approximately 30 seconds once invoked and changes to a new current channel 156. Once the current channel 156 is changed, a random backoff of approximately five minutes is performed before a new channel is selected.

The second adder 142 takes the baseline range 132 and the range adjustment 134 as inputs and produces a current range value 150. The current range value 150 is supplied as the second input for the first adder 140, which uses the required received power 130 as a first input, and produces a transmission power value 152. The current range value 150 is also supplied as an input to the EDT control algorithm 118, the frequency selection (optimization) algorithm 120, and the frequency selection (escape) algorithm 122 as described above in connection with the respective algorithms.

Figure 2:
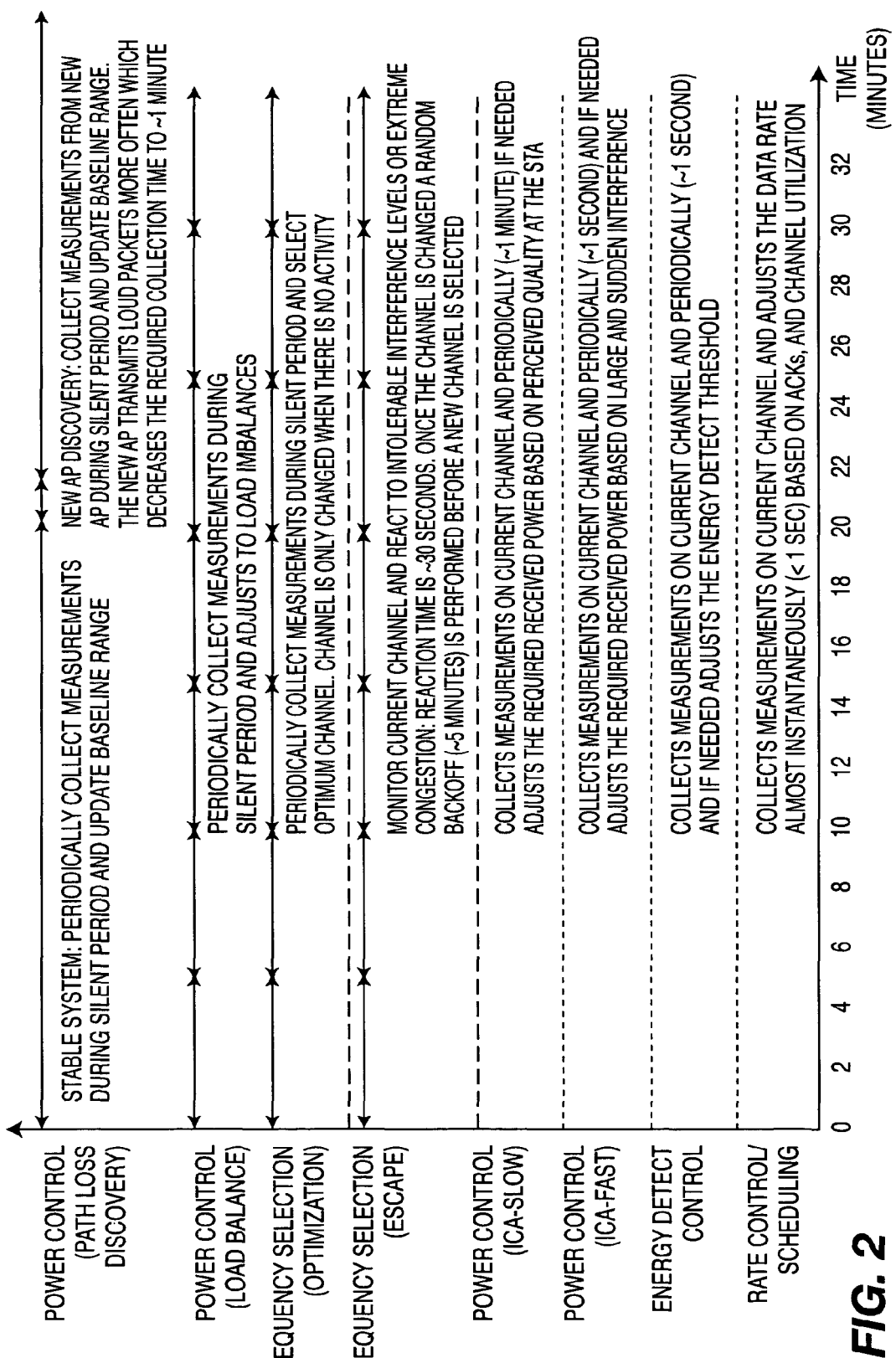
FIG. 2 is an overview diagram of the timing for the RRM algorithm architecture shown in FIG. 1.

FIG. 2 shows the frequency of operation of the various algorithms. The present invention is designed to react relatively quickly to its changing environment. New APs are discovered within approximately one or two minutes, and the system is able to balance severe load imbalances within five minutes to address the "meeting room" scenario, for example. In addition, quick-reacting algorithms such as frequency selection escape react within tens of seconds to severe interference or congestion situations.

VI. Use Case 1: Severe External Interferer

Figure 3:
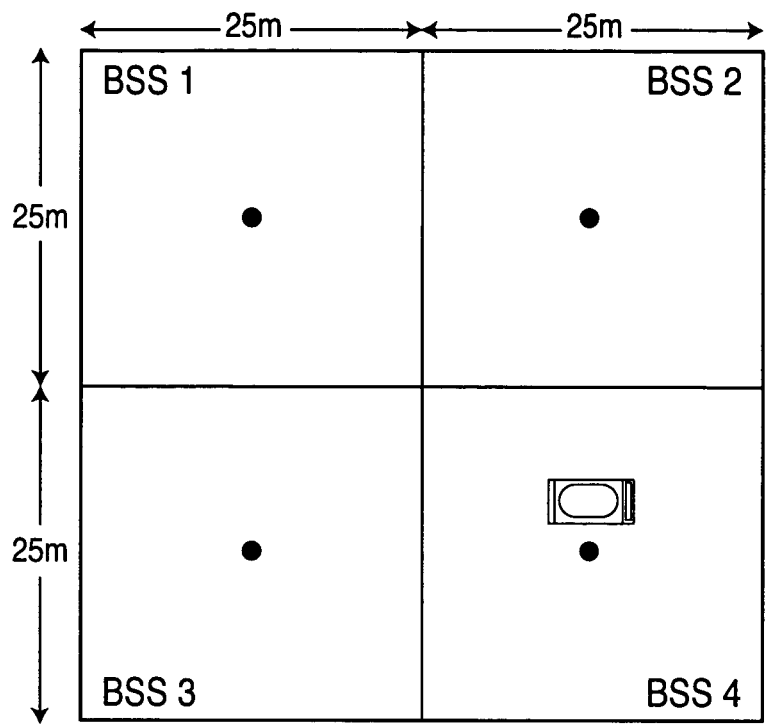
FIG. 3 is a top plan view of a system layout for an external interference use case.

The following use case illustrates the sudden occurrence of a severe external interferer. The basic network layout is illustrated in FIG. 3, where four APs (BSS 1 through BSS 4) are setup in a 50 m×50 m building. AP 4 is placed next to a small office kitchen, where a microwave oven resides.

Certain assumptions are made on the interference generated by the microwave oven, based on empirical tests. The interference generated by the microwave oven is highest in channel 11, lower in channel 6, and very low in channel 1. Moreover, the interference is only unsupportable when located near the microwave oven (i.e., within BSS 4).

Prior to microwave usage, the system is in the following state: all BSSs are operating at a similar medium load, with high satisfaction for all served stations; all APs are transmitting at 5 dB below their maximum power setting; and all stations are transmitting at maximum power.

The initial channel assignment for each BSS is given in Table 1.

TABLE 1

| Initial channel assignment for each BSS | |
| --- | --- |
| BSS ID | Initial Channel |
| 1 | 11 |
| 2 | 1 |

TABLE 1-continued

| Initial channel assignment for each BSS | |
| --- | --- |
| BSS ID | Initial Channel |
| 3 | 6 |
| 4 | 11 |

Once the microwave oven is turned on, BSS 4 perceives an intolerable interference level, whereas the interference levels in BSS 1 and BSS 3 are increased.

Figure 4A:
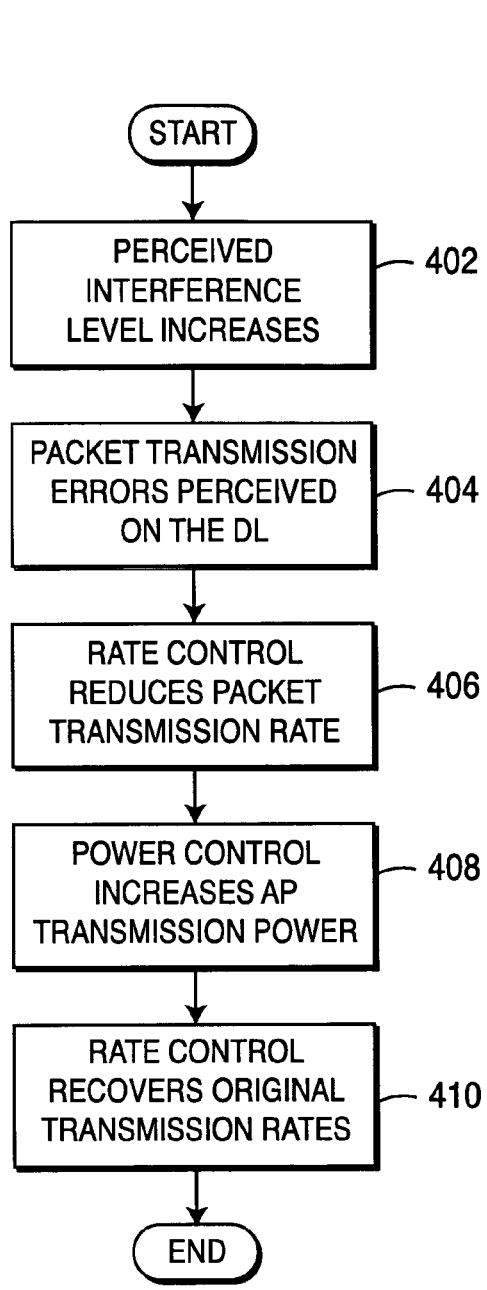
FIGS. 4a and 4b are flowcharts showing the actions taken by access points in the use case shown in FIG. 3.

In AP 1 and Ap 3, the following sequence of events occurs, as shown in FIG. 4a. The perceived interference level increases due to microwave radiation, raising the receiver noise floor by about 3 dB for both APs and stations (step 402). Packet transmission errors are perceived on the downlink (DL; step 404). The rate control algorithm immediately attempts to solve the interference problem by reducing the packet transmission rate (step 406). The power control (interference estimation) algorithm realizes the increase in interference and increases the AP transmission power by 3 dB (step 408). Rate control eventually recovers the original transmission rates for each station (step 410).

Figure 4B:
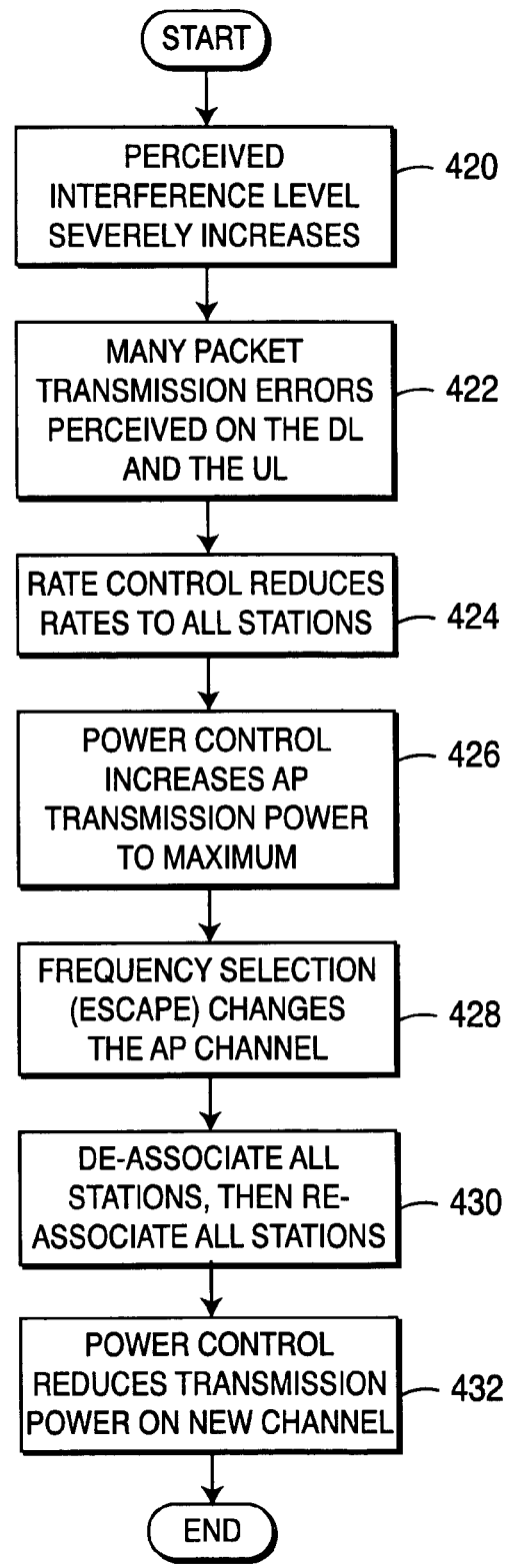

In AP 4, the following sequence of events occurs, as shown in FIG. 4b. The perceived interference level severely increases due to microwave radiation, raising the receiver noise floor by about 20 dB for both APs and stations (step 420). Many packet transmission errors are perceived on the DL and the uplink (UL; step 422). The rate control algorithm immediately reduces the rates to all stations (step 424). The power control algorithm realizes the increase in interference and increases the AP transmission power to the maximum AP transmission power (step 426). Since an excessively high packet error rate is still perceived, the frequency selection escape algorithm is triggered. The AP changes its channel from channel 11 to channel 1, where the microwave oven generates much less interference (step 428). All stations are de-associated, and eventually re-associate (step 430). The power control algorithm reduces the transmission power according the perceived interference level on channel 1 (step 432).

The final channel assignment for each BSS is given in Table 2.

TABLE 2

| Final channel assignment for each BSS | |
| --- | --- |
| BSS ID | Final Channel |
| 1 | 11 |
| 2 | 1 |
| 3 | 6 |
| 4 | 1 |

VII. Use Case 2: Meeting Room Scenario

Figure 5:
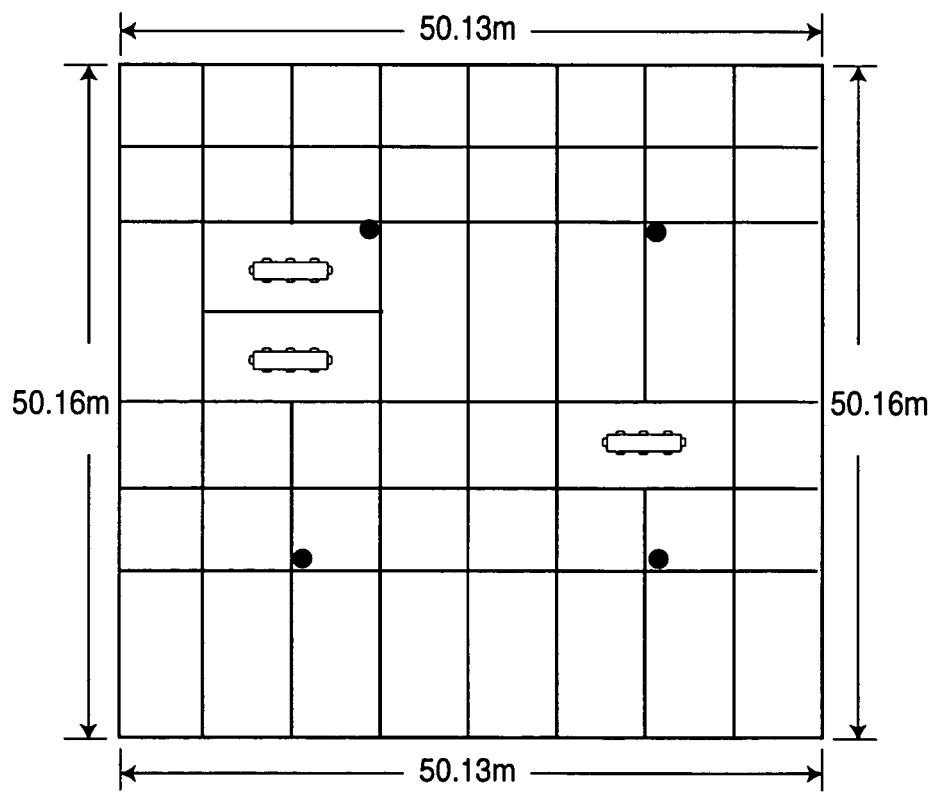
FIG. 5 is a top plan view of a system layout for an office-based meeting room use case.

Assume that there is a four AP WLAN system covering an area of 50 m×50 m. Each AP covers approximately 25 m×25 m. The area is divided into mainly offices with one large conference room and one small conference room. Each office is either a single or dual person office. Each employee has a laptop with wireless LAN access. APs are placed more or less in each quadrant of the area as shown in FIG. 5.

The main assumptions in this scenario are that the APs are evenly balanced, each assuming one quarter of the total load, and operate initially on the channels shown in Table 3. The total load on each AP is light, with approximately 10% of the AP's available capacity being used.

TABLE 3

Initial channel assignment for each AP

| Quadrant | Initial Channel |
|---|---|
| Upper left (ULQ) | 1 |
| Upper right (URQ) | 6 |
| Lower left (LLQ) | 11 |
| Lower right (LRQ) | 1 |

Figure 6:
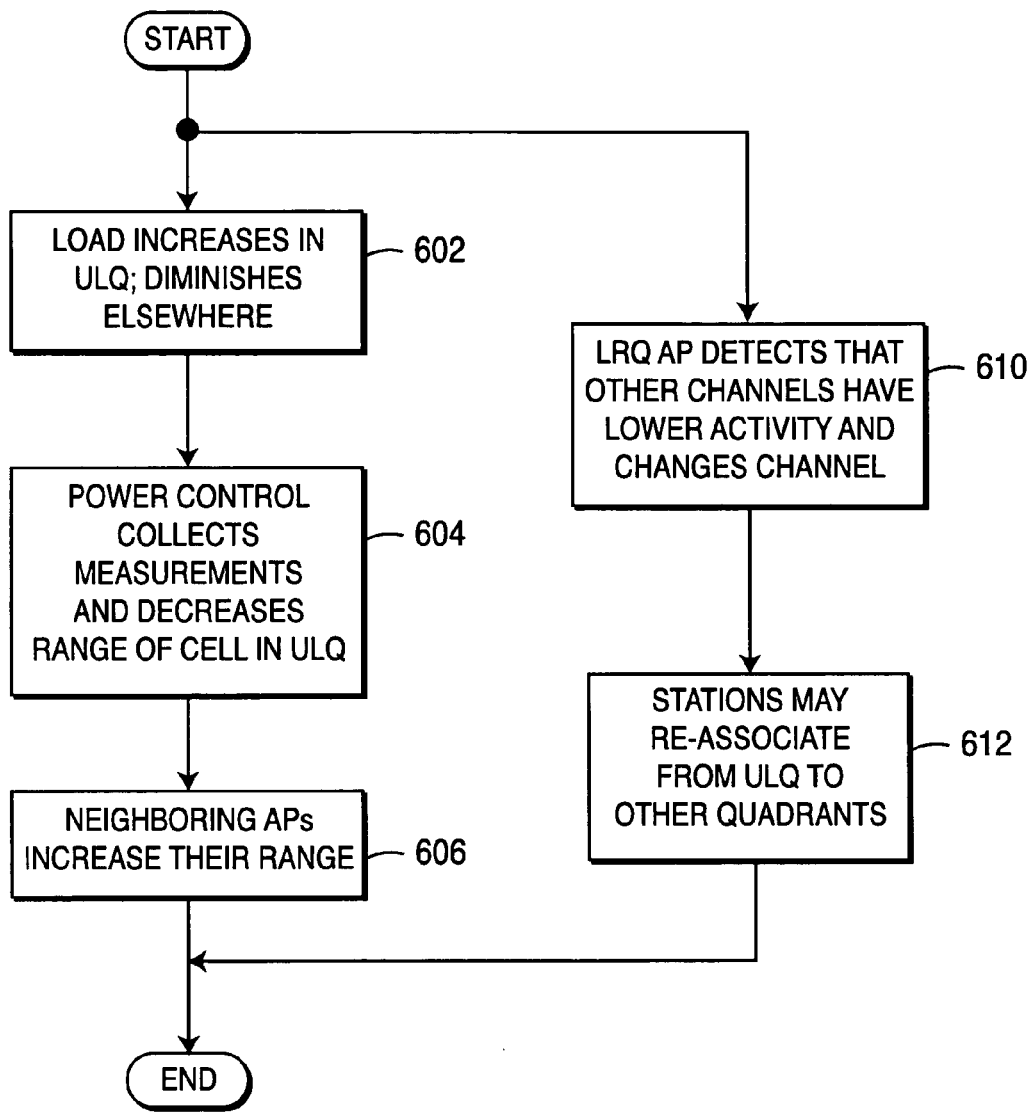
FIG. 6 is a flowchart showing the actions taken by access points in the use case shown in FIG. 5.

The following events and actions occur, as shown in FIG. 6. A large meeting takes place in the two conference rooms in the ULQ. The load suddenly increases for the ULQ AP due to the increased activity, while the load in the other quadrants diminishes (step 602). Within five to ten minutes, power control (load balance) has collected enough measurements to determine that it needs to decrease the range of the affected cell (step 604). Similarly, the neighboring APs also detect an increased load in the ULQ, and thus increase the range of their APs (step 606). They can afford to do this since the load is light in their coverage areas. The increase of transmission power immediately benefits those stations that decided to connect to one of the neighboring APs despite their less favorable location.

In parallel, the frequency selection optimization in the LRQ AP (which is using the same channel as the ULQ AP) finds that the activity on the other channels is much lower than the channel it is currently using and makes a decision to change the frequency to either channel 6 or channel 11 (step 610). The actual change will take place only when there is no activity in the LRQ AP.

Stations in the fringe areas of the ULQ could re-associate to the other AP quadrants (step 612). Some stations include built-in load balancing features, and could then easily choose a less loaded AP, as the coverage area has been increased.

The previously described RRM algorithms can be utilized by an AP. The components of the AP performing RRM may be a single integrated circuit (IC), such as an application specific integrated circuit; multiple ICs; discrete components; or a combination of IC(s) and discrete components.

Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for operating an autonomous radio resource management (RRM) apparatus in a wireless access point (AP), comprising:

obtaining a first group of parameters from a current traffic channel; performing a first adjustment of a transmission or reception value using at least one parameter from the first group of parameters, the transmission or reception value comprising at least one of: a transmission power, a transmission data rate, or a channel;

performing a second adjustment of a transmission or reception value based on results produced by the first adjustment, the results comprising a change in a value of at least one of: a received signal strength indicator, packet durations, a packet error rate, a deferral rate, acknowledgement, or a clear channel assessment threshold the second adjustment being different from the first adjustment, wherein the second adjustment is additionally based on:

a value of at least one parameter in a second group of parameters measured in all available channels, the second group comprising at least one of: acknowledgement, clear channel assessment threshold, or received signal strength indicator;

wherein selection of the first group of parameters and the second group of parameters is a grouping based on reaction time; and repeating the performing of the first and second adjustments, wherein radio resources are autonomously managed; wherein the first adjustment and the second adjustment each comprise at least one of:

adjusting the transmission data rate; adjusting determining a required received power value and adjusting the transmission power to achieve the required received power value;

producing determining a baseline range value used for determining an optimal coverage area of the AP and adjusting the transmission power to achieve the baseline range value;

producing determining a range adjustment value used for adjusting the coverage area of the AP to correct for load imbalances between the AP and neighboring APs and adjusting the transmission power to achieve the range adjustment value; and selecting a new channel for changing a current channel assignment based on load balancing across available channels, or based on detecting intolerable levels of interference and congestion where adjusting the transmission power of the AP or adjusting the transmission data rate is not adequate.

2. The method according to claim 1, wherein the second group of parameters are measured during a silent period.

3. An integrated circuit comprising circuitry configured to:

obtain a first group of parameters from a current traffic channel;

perform a first adjustment of a transmission or reception value using at least one parameter from the first group of parameters, the transmission or reception value comprising at least one of: a transmission power, a transmission data rate, or a channel;

perform a second adjustment of a transmission or reception value based on results produced by the first adjustment, the results comprising a change in a value of at least one of: a received signal strength indicator, packet durations, a packet error rate, a deferral rate, acknowledgement, or a clear channel assessment threshold;

the second adjustment being different from the first adjustment, wherein the second adjustment is additionally based on:

a value of at least one parameter in a second group of parameters measured in all available channels, the second group comprising at least one of: acknowledgement, clear channel assessment threshold, or received signal strength indicator;

wherein selection of the first group of parameters and the second group of parameters is a grouping based on reaction time; and repeat the performing of the first and second adjustments, wherein radio resources are autonomously managed;

wherein the first adjustment and the second adjustment each comprise at least one of:

adjusting the transmission data rate;

determining a required received power value and adjusting the transmission power to achieve the required received power value;

determining a baseline range value used for determining an optimal coverage area of the AP and adjusting the transmission power to achieve the baseline range value;

determining a range adjustment value used for adjusting the coverage area of the AP to correct for load imbalances between the AP and neighboring APs and adjusting the transmission power to achieve the range adjustment value; and selecting a new channel for changing a current channel assignment based on load balancing across available channels, or based on detecting intolerable levels of interference and congestion where adjusting the transmission power A12 or adjusting the transmission data rate is not adequate.

* * * * *

UNITED STATES PATENT AND TRADEMARK OFFICE
CERTIFICATE OF CORRECTION

PATENT NO. : 7,949,342 B2  
APPLICATION NO. : 10/951124  
DATED : May 24, 2011  
INVENTOR(S) : Cuffaro et al.

It is certified that error appears in the above-identified patent and that said Letters Patent is hereby corrected as shown below:

IN THE CLAIMS

At Claim 1, column 10, line 17, after "adjusting the transmission data rate", delete "adjusting".

At Claim 1, column 10, line 21, before "determining" delete "producing".

At Claim 1, column 10, line 25, before "determining" delete "producing".

At Claim 3, column 12, line 8, after "mission power" delete "A12".

Signed and Sealed this  
Seventeenth Day of January, 2012

David J. Kappos  
*Director of the United States Patent and Trademark Office*